Dec. 13, 1960    R. R. LYNN    2,964,444
METHOD OF MAKING A LAMINATED METAL AIRSCREW BLADE
Filed Feb. 19, 1957
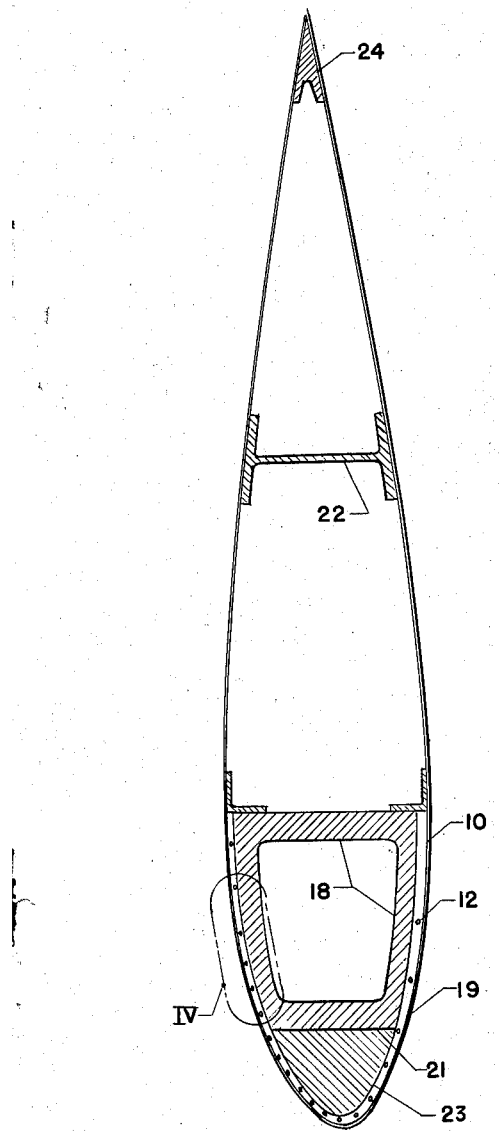
FIG. 3
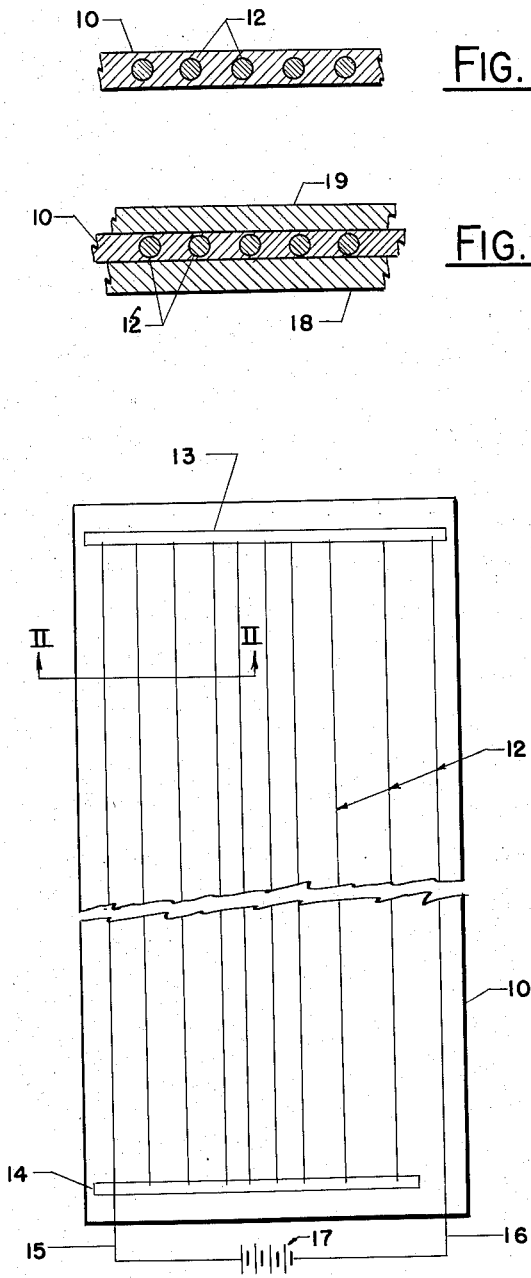
FIG. 2
FIG. 4
FIG. 1
INVENTOR.
ROBERT R. LYNN
BY
Beau, Brooks, Buckley + Beau.
ATTORNEYS United States Patent Office 2,964,444
Patented Dec. 13, 1960

2,964,444

METHOD OF MAKING A LAMINATED METAL AIRSCREW BLADE

Robert R. Lynn, Arlington, Tex., assignor to Bell Aerospace Corporation, Wheatfield, N.Y.

Filed Feb. 19, 1957, Ser. No. 641,069

6 Claims. (Cl. 154—126)

This invention relates to rotary wing aircraft rotor constructions, or other aircraft structures such as airfoils, propeller blades, or the like. More specifically, the invention is particularly applicable to the construction of rotor blades for helicopter aircraft or the like, and relates to methods and means for fabricating such blades while at the same time constructing them to embody deicing means integral with the structure.

Ice accumulations on helicopter rotor blades are substantially more hazardous than on other aircraft surfaces. This is because of the relatively slim airfoil section of such blades whereby only slight changes in the profile shape, such as due to ice accumulations, change the aerodynamic characteristics of the blades with consequent serious in-profile drag. Furthermore, ice accumulations on rotary wing aircraft blades are dangerous because when such ice accumulations break up and fly off, they create dangerous vibration. Provision of deicing rubber boots around the leading edge portions of such blades have resulted in serious loss of lift due either to the additional weight of the structure or the alteration of the aerodynamic characteristics due to the consequent blade contour change. Of the various type heating devices heretofore employed in aircraft airfoil or rotor blade or propeller blade structures, the electrical-resistance heating wire arrangement has been found to be most practical. However, to embody heating wires internally of such blade structures has heretofore been found to be inefficient from the standpoint of the heating effect required, or otherwise impracticable from the standpoint of the problems involved in fabrication of the blade. Extraneous additions of "blankets" embodying heating wires or the like, as wrap-around adjuncts to the leading edge portion of a blade have been found to be highly undesirable because of the attendant increased weight and change of the blade profile with consequent alterations of the aerodynamic characteristics of the blade.

It is an object of the present invention to provide in an aircraft rotor or the like an improved leading edge heating device, resulting in no appreciable aerodynamic contour change of the rotor blade section.

It is a further object of the invention to provide a deicing means as aforesaid which adds only as absolute minimum of weight to the blade structure.

It is a further object of the invention to provide an improved rotor blade construction as aforesaid wherein the electrical heating elements are completely protected against erosion or physical damage such as would be harmful for example to rubber boot type deicing arrangements.

Another object of the invention is to provide an improved method and means useful in connection with fabrication of airfoil structures such as helicopter rotor blades or the like, and such structures as are required to be electrical-resistance heated for deicing purposes.

Another object of the invention is to provide an improved deicing type aircraft structure. Other objects of the invention will appear from the specification hereinafter.

It is a further object of the invention to provide the features and advantages aforesaid in combination with an adhesively bonded laminated metal airfoil structure adapted to be fabricated as in normal manufacturing processes with minimum extra cost and effort.

In the accompanying drawings:

Figure 1 is a fragmentary plan view of a sheet of material used in the fabrication of an airfoil structure in accordance with the present invention; said sheet of material having embedded therein electrical heating elements and being basically of metal adhesive and electrical insulative properties;

Fig. 2 is a fragmentary cross sectional view, on an enlarged scale, taken along line II—II of Fig. 1;

Fig. 3 is a typical sectional view through a helicopter rotor blade construction, embodying the features of the present invention; and Fig. 4 is a fragmentary sectional view, on an enlarged scale, taken along line IV—IV of Fig. 3.

As shown in Figs. 1, 2, the invention contemplates initial provision in self-sustaining sheet or ribbon form of a semi-polymerized synthetic plastic metal-to-metal or metal-to-wood bonding material as indicated at 10. Such materials are presently commercially available, for example, under the tradename "Narmco 4021" as manufactured by the Narmco Mfg. Co. and "AF 6 Adehsive Tape" made by Minnesota Mining & Mfg. Co. This sheet or strip of material has embedded therein suitably spaced relation a series of electrical resistance wires as indicated at 12; the pattern being of course varied to suit the particular conditions to be met with in each instance of application. Arrangements for connecting the wires 12 to an electrical source may of course be of any type preferred; and as shown for example in Fig. 1, the connections may be accomplished by means of bus bars formed of metal foil or the like as indicated at 13—14 (Fig. 1); conductors 15, 16 being then arranged to extend from the sheet for connection to a suitable power source as indicated at 17.

Or, in the alternative, the heating device may comprise a single resistance wire disposed within the sheet 10 either in single strand form or in a reversely bent or zig-zag arrangement, such as may be preferred or as may be suitable in any given instance of installation. In any case, it will be appreciated that as illustrated in Fig. 2, the conductor strands 12 will be separated and electrically insulated from one another and from any metal contacts exteriorly of the sheet by means of the plastic material forming the body of the sheet 10.

As stated hereinabove, the invention contemplates that a sheet or strip such as designated 10 embodying the heating wires or the like therewithin will be initially fabricated in the form illustrated so as to be only semi-polymerized but in self-sustaining form whereby to be adapted to be stock-piled so as to be readily available incidental to mass production blade assembly operations such as will now be described. Figs. 3, 4 illustrate a typical form of metal rotor blade construction present in use for example in helicopter aircraft. Such blade structures have heretofore been fabricated by welding or riveting or otherwise interconnecting the framing and skin components of the blade structure. For example, as shown in Fig. 3, the blade structure consists of a basic spar member 18 to which is adhesively bonded a sheet metal skin 19 and a leading edge or nose piece 20; the spar 18 and the nose piece 20 being adhesively bonded together at the joint line designated 21. The frame work of the blade structure is completed by means of a second spar member 22 and a trailing edge member 24; both of which are also fixed to the skin member 19 as by means of a suitable metal-to-metal plastic adhesive, as is well known in the art.

In accordance with the present invention, fabrication of the airfoil structure is completed by interposing between the spar and nose members 18, 20 and the skin member 19 a sheet of adhesive material as illustrated at Fig. 1. Thus, all of the metal components of the blade structure will be individually prefabricated and relatively assembled in a suitable jig or the like into the relative positions thereof shown in Fig. 3; a sheet of plastic adhesive material 10 being interposed therewithin as explained hereinabove. Application of heat and pressure upon the assembled components of the structure will then cause the plastic adhesive contents of the assembly to melt and polymerize into metal bonding form, thereby completing the fabrication of a sturdy "all metal" rotor blade.

It is a particular feature of the present invention that incidental to this blade component assembly method and means of the invention the finished blade structure will embody within the leading edge portion thereof closely adjacent the skin surface of the blade, a series of electrical heating elements such as are readily connectible to a suitable power source, as explained hereinabove. Thus, whereas the finished blade of the present invention is externally of ideal surface contour and surface uninterrupted form, it embodies at positions immediately under the skin surface thereof electrical heating devices adapted to impart thereto the necessary heat for preventing formation of ice or for melting of ice subsequent to formations thereon.

It will of course be appreciated that the invention is equally applicable to use in connection with structural elements of other than metal form, such as wood, plastic, etc.; and that although only one form of the invention has been shown and described in detail, it will be apparent to those skilled in the art that the invetnion is not so limited but that various changes may be made therein without departing from the spirit of the invention or the scope of the appended claims.

I claim:

1. The method of fabricating an airscrew blade comprising an assembly of metal parts adhesively bonded together, said method including the steps of preforming said metal parts, positionally assembling said parts while interposing between at least two of said parts a single self-sustaining semi-polymerized plastic adhesive continuous sheet of material having embedded integrally therewithin an electrical resistance heating element, and then heating and pressing said metal parts together thereby causing said adhesive to finally polymerize into metal bonding form.

2. The method of fabricating a helicopter rotor blade comprising essentially an assembly of metal parts adhesively bonded together, said method including the steps of preforming said metal parts, positionally assembling said parts while interposing therebetween a single self-sustaining uncured plastic adhesive sheet of material having embedded integrally therewithin an electrical resistance heating element, and then heating and pressing said metal parts together thereby causing said adhesive to finally cure into metal bonding form.

3. The method of fabricating a helicopter rotor blade comprising essentially an assembly of parts adhesively bonded together, said method including the steps of preforming said parts, positionally assembling adjacent of said parts while interposing therebetween a single continuous self-sustaining uncured adhesive sheet having embedded integrally therewithin an electrical resistance heating element, and then heating and pressing said parts and adhesive sheet together thereby causing said adhesive to finally cure into parts bonding and electrical insulating form.

4. The method of fabricating a helicopter rotor blade comprising an assembly of parts adhesively bonded together, said method including the steps of preforming said parts, positionally assembling said parts while interposing between at least two of said parts a single self-sustaining semi-polymerized plastic adhesive sheet of material having embedded integrally therewithin an electrical resistance heating element, and then heating and pressing said parts together thereby causing said adhesive to finally polymerize into parts bonding form.

5. The method of fabricating an airscrew blade comprising essentially an assembly of parts adhesively bonded together, said method including the steps of preforming said parts, positionally assembling said parts while interposing therebetween a single self-sustaining uncured plastic adhesive sheet of material having embedded integrally therewithin an electrical resistance heating element, and then heating and pressing said parts and adhesive sheet material together thereby causing said adhesive to finally cure into parts bonding form.

6. The method of fabricating a helicopter rotor blade comprising essentially an assembly of parts including a leading edge cap part adhesively bonded to other parts of the structure, said method including the steps of preforming said parts, positionally assembling said cap and adjacent parts while interposing therebetween a single continuous self-sustaining uncured adhesive sheet having embedded integrally therewithin an electrical resistance heating element, and then heating and pressing said parts together thereby causing said adhesive to finally cure into parts bonding and electrical insulating form.

References Cited in the file of this patent

UNITED STATES PATENTS

| | | |
|---|---|---|
| 2,226,589 | Smyers | Dec. 31, 1940 |
| 2,393,100 | Gallay | Jan. 15, 1946 |
| 2,401,987 | Taylor | June 11, 1946 |
| 2,470,509 | Marini | May 17, 1949 |
| 2,499,134 | De Bruyne | Feb. 28, 1950 |
| 2,548,467 | Crise | Apr. 10, 1951 |
| 2,715,598 | Rees | Aug. 16, 1955 |
| 2,742,390 | Beck | Apr. 17, 1956 |

FOREIGN PATENTS

| | | |
|---|---|---|
| 26,644 | Great Britain | 1898 |